US007684381B2

(12) United States Patent
Schrum, Jr. et al.

(10) Patent No.: US 7,684,381 B2
(45) Date of Patent: Mar. 23, 2010

(54) OFFSET BEACON FOR DISTRIBUTED MANAGEMENT AND CONTROL OF WIRELESS NETWORKS

(75) Inventors: Sidney B. Schrum, Jr., Allen, TX (US); Fred S. Stivers, Wylie, TX (US)

(73) Assignee: QUALCOMM Incorporated, San Diego, CA (US)

( * ) Notice: Subject to any disclaimer, the term of this patent is extended or adjusted under 35 U.S.C. 154(b) by 499 days.

(21) Appl. No.: 11/121,372

(22) Filed: May 4, 2005

(65) Prior Publication Data

US 2005/0265306 A1 Dec. 1, 2005

Related U.S. Application Data

(60) Provisional application No. 60/567,862, filed on May 4, 2004.

(51) Int. Cl.
*H04J 3/06* (2006.01)
*H04J 3/24* (2006.01)
*H04Q 7/20* (2006.01)

(52) U.S. Cl. .................. 370/350; 370/338; 370/473; 370/349

(58) Field of Classification Search .................. 370/310, 370/468, 331, 332, 338, 347, 350, 324, 349, 370/329, 278, 449; 455/41.2, 500
See application file for complete search history.

(56) References Cited

U.S. PATENT DOCUMENTS

| 6,980,810 | B1* | 12/2005 | Gerakoulis et al. ........ 455/450 |
| 7,302,227 | B2* | 11/2007 | Sakoda ........................ 455/41.2 |
| 2002/0118664 | A1* | 8/2002 | Ishibashi et al. ............. 370/338 |
| 2002/0141356 | A1* | 10/2002 | Beidas et al. ................ 370/324 |
| 2003/0137993 | A1* | 7/2003 | Odman ......................... 370/468 |
| 2003/0174690 | A1* | 9/2003 | Benveniste ................... 370/350 |
| 2004/0114563 | A1* | 6/2004 | Shvodian ..................... 370/347 |
| 2005/0068934 | A1* | 3/2005 | Sakoda ........................ 370/350 |
| 2005/0174953 | A1* | 8/2005 | Ho ............................... 370/310 |

\* cited by examiner

*Primary Examiner*—Charles N Appiah
*Assistant Examiner*—Kiet Doan
(74) *Attorney, Agent, or Firm*—Dang M. Vo

(57) ABSTRACT

Using this methodology, a wireless network can be self-forming or "ad-hoc" in nature. That is, the formation of the network does not depend upon the presence of a pre-determined central coordinator. Second, it can accommodate relatively rapid changes in network configuration, including changes in the number and location of the devices participating in the network, and changes in the channel conditions experienced by communication devices. Third, it can accommodate an extended network system where the population of devices that are able to communicate wirelessly, either directly, or indirectly via devices that also act as repeaters, may be spread over a relatively large geographic area. Fourth, it can provide robust Quality of Service through the use of time reservations or "slots" during which one device or a limited number of devices are allowed to transmit. Fifth, it can provide good power management qualities, such that there are mechanisms which allow devices minimize active time and to transition in and out of reduced power "sleep" states while still maintaining the ability to communication.

19 Claims, 3 Drawing Sheets

OFFSET BEACON FOR DISTRIBUTED MANAGEMENT AND CONTROL OF WIRELESS NETWORKS

CROSS REFERENCE TO RELATED APPLICATION

This application is a non-provisional application and claims priority back to U.S. Provisional Application Ser. No. 60/567,862 filed on May 4, 2004 also entitled "Offset Beacon for Distributed Management and Control of Wireless Networks."

TECHNICAL FIELD OF THE INVENTION

The present invention relates to a system for controlling the interaction of various devices in a wireless network. Specifically, the system is used to ensure that wireless communications over a specific channel are synchronized within the context of a superframe timing scheme so that only one device is transmitting at any one moment.

BACKGROUND OF THE INVENTION

For certain wireless networking applications, it is desirable if not essential for the network to have all of the following properties: First, it should be self-forming or "ad-hoc" in nature. That is, the formation of the network does not depend upon the presence of a pre-determined central coordinator. Second, it should be able to accommodate relatively rapid changes in network configuration, including changes in the number and location of the devices participating in the network, and changes in the channel conditions experienced by communication devices. Third, it should be able to accommodate an extended network system where the population of devices that are able to communicate wirelessly, either directly, or indirectly via devices that also act as repeaters, may be spread over a relatively large geographic area. Fourth, it should be able to provide robust Quality of Service through the use of time reservations or "slots" during which one device or a limited number of devices are allowed to transmit. Fifth, it should provide good power management qualities, such that there are mechanisms which allow devices minimize active time and to transition in and out of reduced power "sleep" states while still maintaining the ability to communication.

Unfortunately, wireless networks are not this robust. Instead a wireless network requires a central coordinator to establish a timing scheme. Wireless networks typically are organized into "cells". Each cell is managed by a central coordinator. Devices within range of a given coordinating device may join the cell and participate in the network. Central cell coordinators transmit special frames known as "beacons" at precise intervals. Beacons typically provide the following functions: announce the existence of the network; indicate the network's capabilities; provide a timing mark for network synchronization; provide timing information for when different network access methods are available, including reserved "slots" of time for use by a single station or a limited number of stations; and provide timing information and other information which allows devices to determine when they may enter and exit reduced power management states.

The time from one beacon to the next is sometimes referred to as a "superframe". The central coordinator maintains superframe timing, including the superframe interval (or conversely, the superframe repetition rate) and the superframe phase (superframe start time). Specific intervals or "slots" are established relative to beacon transmission, or more precisely, relative to the start of the superframe. Devices that are synchronized to the central coordinator and that have one or more reserved slots may transmit at the appropriate time during the superframe, even if some beacons are not properly received To summarize, with current wireless networks, frames (i.e. "beacons") that provide an indication of the position in time of the superframe are sent only by central coordinators, and are sent either precisely at the start of the superframe, or as soon network conditions permit after the start of the superframe. The superframe forms a time basis for managing and scheduling network activity. However, this type approach does not provide the desirable properties described above. Instead, a need exists for a system of coordinating a wireless network that does not have a central coordinator.

SUMMARY OF THE INVENTION

For wireless networks to be fully distributed, a need exists for a method of coordinating the devices within the network without the use of a central coordinator. The present invention uses a beacon signal that is coupled with an "offset" value. A first device on the network creates its own initial superframe timing. When a second device appears, it listens for that superframe and then transmits its beacon signal along with an offset value equal to the time between the start of the superframe and its beacon.

Using this methodology, a wireless network can be self-forming or "ad-hoc" in nature. That is, the formation of the network does not depend upon the presence of a pre-determined central coordinator. Second, it can accommodate relatively rapid changes in network configuration, including changes in the number and location of the devices participating in the network, and changes in the channel conditions experienced by communication devices. Third, it can accommodate an extended network system where the population of devices that are able to communicate wirelessly, either directly, or indirectly via devices that also act as repeaters, may be spread over a relatively large geographic area. Fourth, it can provide robust Quality of Service through the use of time reservations or "slots" during which one device or a limited number of devices are allowed to transmit. Fifth, it can provide good power management qualities, such that there are mechanisms which allow devices minimize active time and to transition in and out of reduced power "sleep" states while still maintaining the ability to communication.

Types of networks that benefit from this type of capability include but are not limited to Wireless Personal Area Networks (WPANs) such as networks based on the IEEE 802.15 standards, and Wireless Local Area Networks (WLANs) such as IEEE 802.11 based standards.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
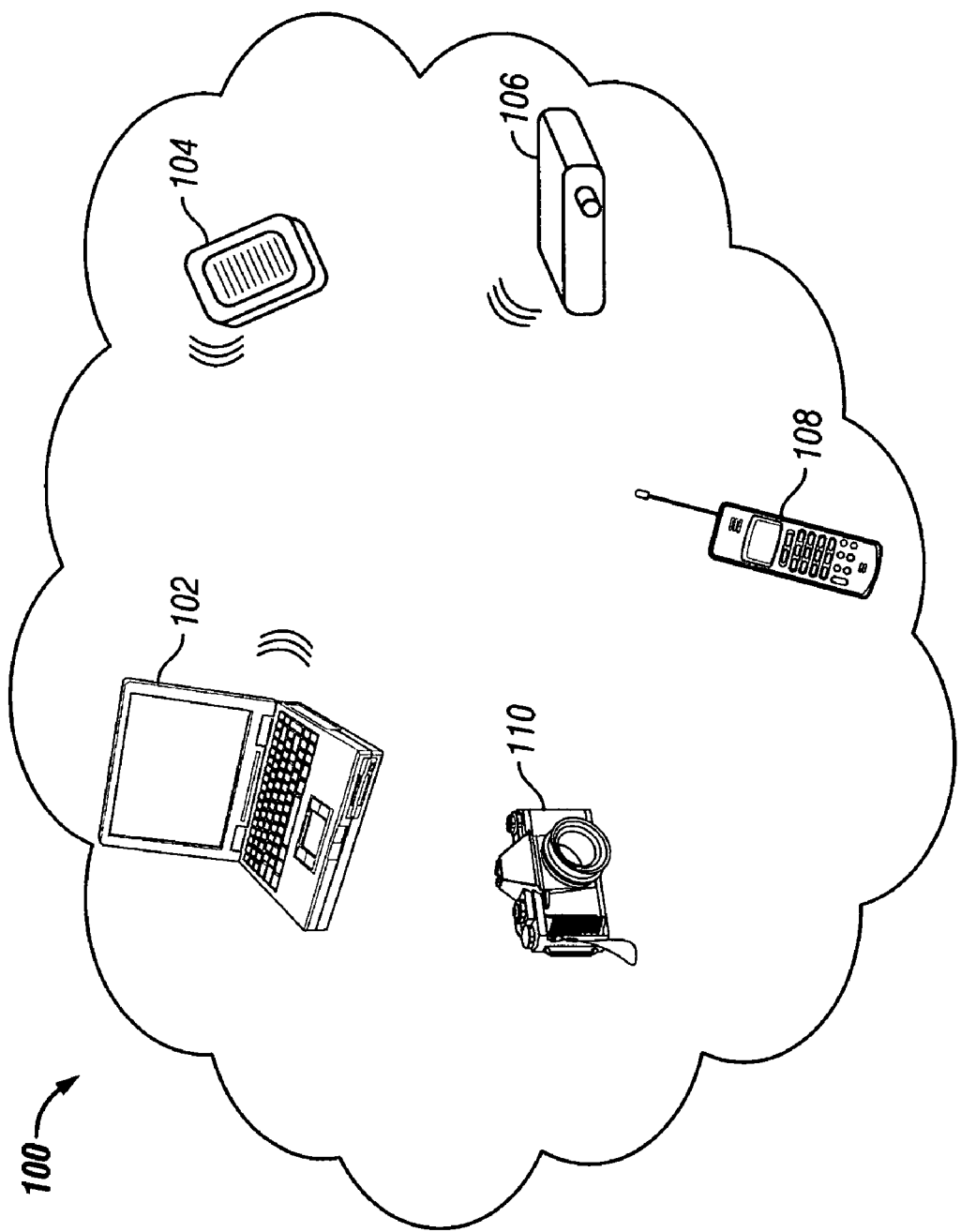
FIG. 1 is an illustration of a wireless network and the various devices that might communicate within one.

A wireless network can contain any assortment of devices. For example in FIG. 1, a wireless network 100 is illustrated. There are no physical connections between any of the devices. For these networks to be dynamic, new devices should be able to enter the network and communicate with existing devices. For example, a laptop computer 102, a personal digital assistant 104, a projector 106, a cell phone 108 or a camera 110 are just some of the devices that might enter into the wireless network. In each instance there could arise a need to communicate between the devices. For example, pictures from the camera 110 could be transmitted to the laptop 102. From there, the photos could be retransmitted to the projector 106. A cell phone 108 might receive a cal and automatically store a voice mail on the lap top 102. No matter the combination or circumstance, there is a need that the communication be orderly. Yet, in this network 100 there is no central controller to coordinate the communications.

Instead, each wireless device must help define and maintain superframe timing. Each device maintains knowledge of its own superframe timing, which may or may not be aligned with the superframe timing maintained by other devices. Each wireless device transmits beacons indicating its superframe timing. Each device also has the capability and procedures for aligning superframe timing between nearby devices in order to provide for coordinated superframe timing, including TDMA slots.

Further, the dependency relationships between devices must be established in order to accomplish superframe alignment. In other words, signaling in the beacons can convey the dependency relationships to other devices. The beacons may be transmitted at any time in the superframe without negatively impacting network operation or functionality. The start of the superframe is indicated with a field in the beacon which indicates the offset between the start of the superframe and the beacon transmission time, as maintained by the device. The invention enables distributed, redundant management of the network which in term enables the desirable qualities listed above.

With the invention, each wireless device maintains superframe timing, and each device transmits beacons. In each beacon is a field (Beacon Offset Field) that indicates the start of the superframe relative to the start of the beacon. The Beacon Offset Field indicates the relative time from the start of the beacon to the start of the superframe. By using signed numbers, the start of either the next or the previous superframe may be indicated. In other words, the offset could be either a positive or negative value. Two devices with different superframe timing that are in close proximity may easily converge their superframe timing by simply adjusting the value in the Beacon Offset Field. This may be done all in one step, or gradually over time. In order to facilitate the propagation of common superframe timing through an extended wireless network, and to facilitate superframe timing convergence, devices may establish superframe timing dependency relationships, whereby one device defers to and aligns to another device's superframe timing. The beacon contains a field that indicates the address of the "parent" device, so that other stations may understand the origin of the superframe timing.

Through Offset Beacon generation, each station can announce its existence, indicate its capabilities, indicate when media access methods are available, and establish and propagate superframe timing information. Offset Beacons allow stations to discover each other, learn each other's capabilities, synchronize media access and communicate directly.

Offset Beacon generation allows the network controller functions to be distributed among the stations in the network. Each of the network controller functions can be performed by one or more of the associated stations. These functions include allocating of media access time, associating new stations to the network, network timing and network security.

The invention enables mechanisms and functionality otherwise not available, and results in multiple advantages. For example, it allows multiple devices in close proximity that transmit beacons and that share common superframe timing to avoid collisions between beacons, and between beacons and other frames. It allows beacons to be transmitted at any time during the superframe, for improved robustness. This permits freedom in establishing beacon transmits times which in tern allow for certain optimizations. For example, beacon transmission time may be chosen based on when the beacon is most likely to be successfully received by other stations (for example in a reserved time periods where the chance of collision is minimized), or when transmission does not interfere with other traffic.

It also allows the frequency of transmission of beacons to be uncoupled from the superframe repetition rate. For robustness, a device may send more than one beacon during a superframe. Conversely, if a device is not helping to establish, maintain, and/or propagate superframe timing for other devices, then the device may not transmit a beacon every superframe in order to save power and bandwidth. It facilitates the creation of classes of devices that are optimized for varying functionality/cost tradeoffs. Some classes of devices might rarely, if ever, transmit beacons.

It facilitates establishment of common of superframe timing among multiple devices. Alignment can be obtained simply by changing the value of a parameter in the beacon. It facilitates propagation of superframe timing through an extended wireless network due to the redundant means used to announce the timing, i.e. through beacons transmitted by multiple devices. Devices do not have to be within range of the device or devices that are fundamentally establishing the superframe timing, merely within range of any station that has knowledge of the superframe timing. It permits devices that utilize differing superframe durations to align superframe timing. This is easily possible as long as the superframe durations are a multiple of one another. It reduces the disruption to the network that occurs when devices that establish superframe timing are no longer available, due to moving out of range, being disabled, etc. This is again owing to the redundant nature in which network superframe timing is maintained and propagated. After a timing master or "parent" is not longer available, one or more stations can seamlessly be promoted to become timing master(s) without changing the superframe duration or timing. The redundancy and distributed nature inherent in the invention provides improved performance across a wide set of network configurations and conditions, including dynamic networks. Devices barely within range of other devices may align their superframe timing to the degree that communication can be supported.

Figure 2:
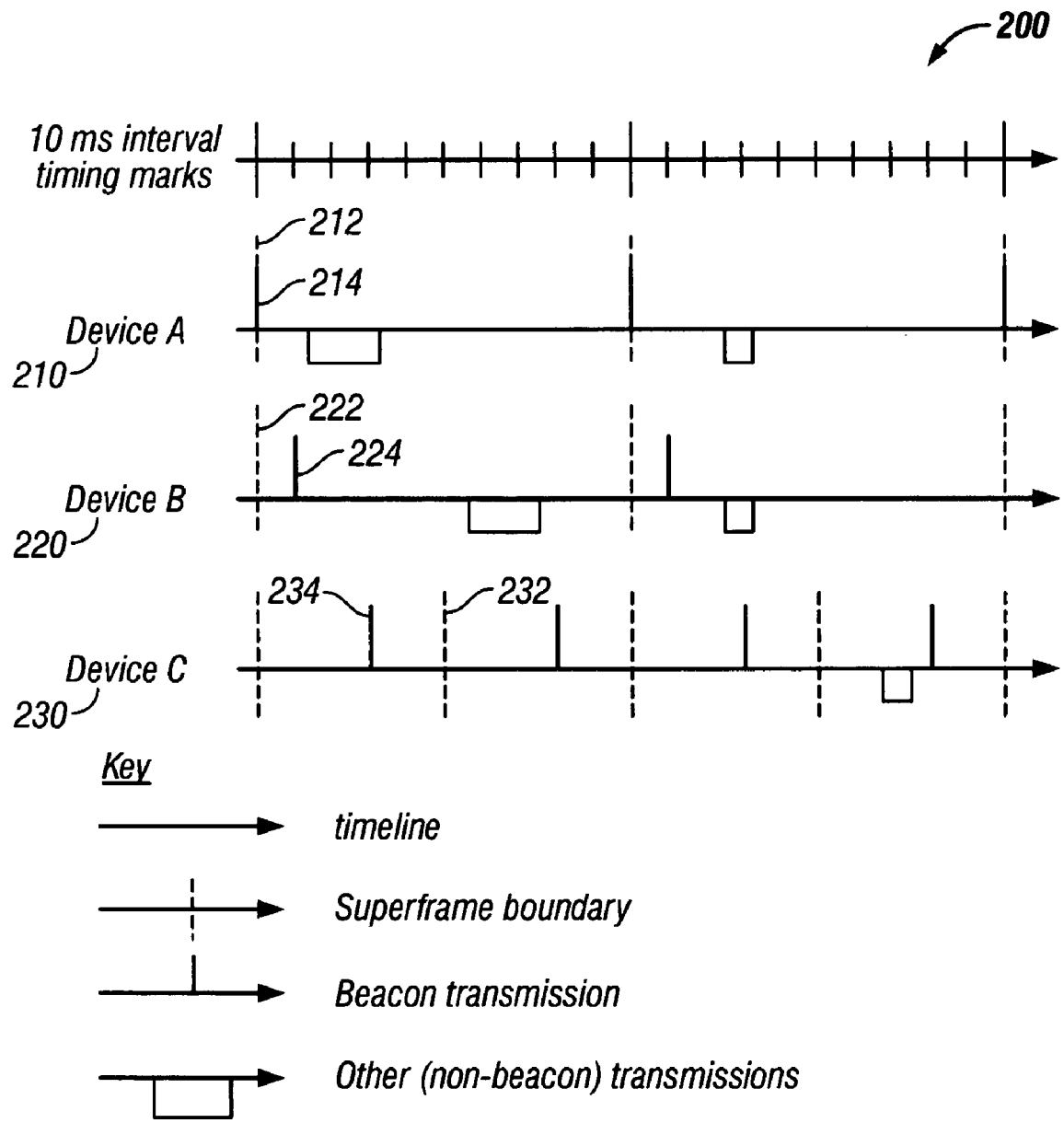
FIG. 2 is a timing diagram showing a superframe and the beacon signals sent by a plurality of wireless devices.

FIG. 2 provides an example timing scheme 200. There are three devices in the network, labeled "A", "B", and "C". Device A 210 is the "root" timing device; Devices B and C, 220 and 230, have aligned their superframe timing with Device A. The parameters transmitted in each beacon include the Beacon Offset Time, the Superframe Period, the Timing Parent Device Address, and the Parent Superframe Offset, as follows:

| Parameter | Device A | Device B | Device C |
|---|---|---|---|
| Beacon Offset | 0 ms | 10 ms | −20 ms |
| Superframe Period | 100 ms | 100 ms | 50 ms |
| Parent Device Address | Device A | Device A | Device A |
| Parent Superframe Offset | 0 ms | 0 ms | 0 ms |

The Beacon Offset is the time from the start of the superframe to the time the beacon is transmitted. The Superframe Period is the duration of the superframe. The Parent Device Address is the address of the device to which the device transmitting the beacon is aligning its superframe timing. Lastly, the Parent Superframe Offset is the time from the Parent Superframe start time to the devices superframe start time. This parameter is optional and is typically has a value of zero. This parameter allows additional flexibility in that "Child" devices may chose to offset their superframe start times.

In order to make the example clearer, beacon transmission is shown as occurring at regular intervals and the Parent Superframe Offset is zero in each case. However, not all embodiments require this. Further, not all embodiments require a strictly ordered dependency relationship between devices for establishing superframe timing, nor a single set of parameters. Optional, devices may choose to propagate the time parameters obtained from beacons transmitted by devices in range that are not parent devices. Finally, the Beacon Offset time could alternately be expressed as a Superframe Offset Time.

In the example Device A declares itself as the Parent device, because it does not derive timing from other devices. Device A has chosen to transmit beacons 214 at the start of the superframe 212 (again, the invention does not require this), and so the beacon offset time is zero. Device B also maintains a superframe period of 100 ms, and it transmits its beacon 224 at 10 ms into the superframe period 222. Device C maintains a superframe period of 50 ms, yet has aligned this period with Device A's period. Device C transmits a beacon 234 at 20 ms before the end 232 of the superframe period. It indicates this by placing a value of −20 ms in the Beacon Offset Field. Devices able to receive the beacons from Devices A, B, and C are therefore able to fully determine the superframe timing for each device, as well as the relationship between the superframes maintained by each device.

Figure 3:
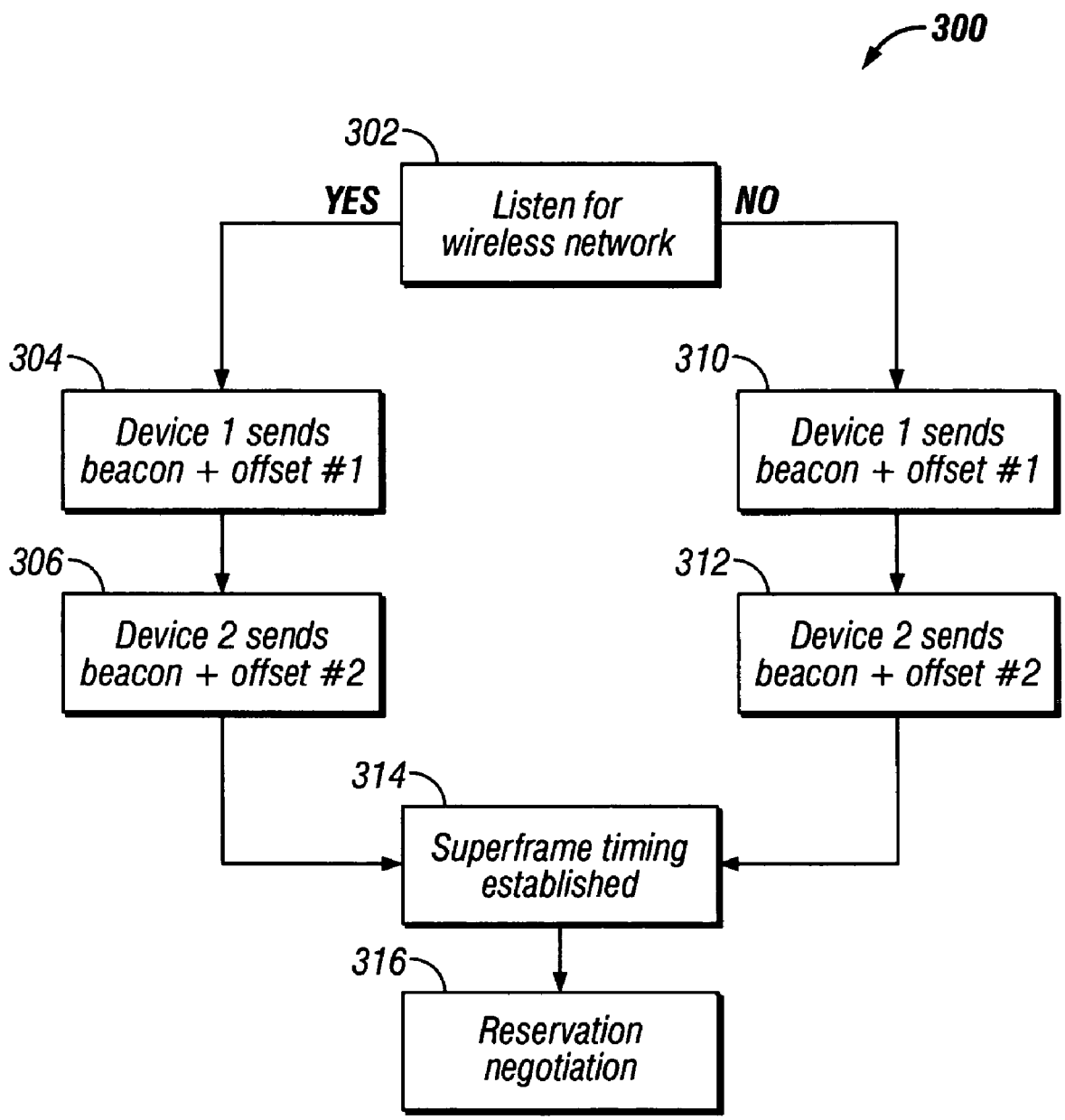
FIG. 3 is a flow chart illustrating the general method of establishing a superframe and for creating reservations.

FIG. 3 provides a flow chart of the general methodology 300 described above. When a first wireless device is active, it listens 302 for a wireless network. If one is detected, then the first device sends 304 a beacon signal and offset information. If a second device is present, it also sends 306 a beacon and an offset. If a wireless network is not detected, then the first device sends 304 a beacon signal and offset information. The offset information may be a zero value. If a second device is present, it also sends 306 a beacon and an offset. Superframe timing is established 314. Once established, it is possible for devices within the network to make reservations for time slots for communications.

While various embodiments of the invention have been described, it will be apparent to those of ordinary skill in the art that many more embodiments and implementations are possible within the scope of the invention. Accordingly, the invention is not to be restricted except in light of the attached claims and their equivalents

I claim:

1. An apparatus for wireless communication, comprising:
   a receiver, wherein the receiver is configured to receive a first beacon signal from a wireless device, the first beacon signal comprising a first offset value indicating a start of a first superframe for the wireless device relative to the first beacon signal;
   a processor, coupled to the receiver, wherein the processor is configured to determine a second offset value indicating the start of the first superframe for the wireless device relative to a start of a second superframe for the apparatus; and,
   a transmitter configured to transmit a second beacon signal, the second beacon signal comprising the second offset value and a third offset value, the third offset value indicating the start of the second superframe relative to the second beacon signal.

2. The apparatus of claim 1, wherein the second offset value is zero.

3. The apparatus of claim 1, wherein the second offset value is positive.

4. The apparatus of claim 1, wherein the second offset value is negative.

5. The apparatus of claim 1, wherein the transmitter is configured to transmit the second beacon signal responsive to the first beacon signal.

6. The apparatus of claim 1, wherein the processor is configured to maintain a superframe timing scheme and adjust the superframe timing scheme responsive to the first beacon signal.

7. The apparatus of claim 1, wherein the transmitter is configured to transmit a plurality of beacon signals during the second superframe, each of the plurality of beacon signals containing a respective offset value indicative of the start of the second superframe relative to a respective one of the plurality of beacon signals.

8. The apparatus of claim 1, wherein the second and third offset values are different.

9. A method, implemented in an apparatus, of wireless communication, the method comprising:
   receiving, at an apparatus, a first beacon signal from a wireless device, the first beacon signal comprising a first offset value indicating a start of a first superframe for the wireless device relative to the first beacon signal;
   determining a second offset value indicating the start of the first superframe for the wireless device relative to a start of a second superframe for the apparatus; and,
   transmitting a second beacon signal, the second beacon signal comprising the second offset value and a third offset value, the third offset value indicating the start of the second superframe relative to the second beacon signal.

10. The method of claim 9, wherein the second offset value is zero.

11. The method of claim 9, wherein the second offset value is positive.

12. The method of claim 9, wherein the second offset value is negative.

13. The method of claim 9, wherein transmitting comprises transmitting the second beacon signal responsive to the first beacon signal.

14. The method of claim 9, further comprising:
   maintaining a superframe timing scheme; and
   adjusting the superframe timing scheme responsive to the first beacon signal.

15. The method of claim 9, wherein transmitting comprises transmitting a plurality of beacon signals during the second superframe, each of the plurality of beacon signals containing a respective offset value indicative of the start of the second superframe relative to a respective one of the plurality of beacon signals.

16. The method of claim 9, wherein the second and third offset values are different.

17. A computer readable medium encoded with instructions that when executed cause an apparatus to perform a method of wireless communication, the method comprising:
receiving, at an apparatus, a first beacon signal from a wireless device, the first beacon signal comprising a first offset value indicating a start of a first superframe for the wireless device relative to the first beacon signal;
determining a second offset value indicating the start of the first superframe for the wireless device relative to a start of a second superframe for the apparatus; and,
transmitting a second beacon signal, the second beacon signal comprising the second offset value and a third offset value, the third offset value indicating the start of the second superframe relative to the second beacon signal.

18. An apparatus for wireless communication, the apparatus comprising:
means for receiving, at an apparatus, a first beacon signal from a wireless device, the first beacon signal comprising a first offset value, the first offset value indicating a start of a first superframe for the wireless device relative to the first beacon signal;
means for determining a second offset value indicating the start of the first superframe for the wireless device relative to a start of a second superframe for the apparatus; and,
means for transmitting a second beacon signal, the second beacon signal comprising the second offset value and a third offset value, the third offset value indicating the start of the second superframe relative to the second beacon signal.

19. A cell phone, comprising:
an antenna;
a receiver coupled to the antenna, wherein the receiver is configured to receive via the antenna a first beacon signal from a wireless device, the first beacon signal comprising a first offset value indicating a start of a first superframe for the wireless device relative to the first beacon signal;
a processor, coupled to the receiver, wherein the processor is configured to determine a second offset value indicating the start of the first superframe for the wireless device relative to a start of a second superframe for the apparatus; and
a transmitter coupled to the antenna and the processor, the transmitter configured to transmit via the antenna a second beacon signal, the second beacon signal comprising the second offset value and a third offset value, the third offset value indicating the start of the second superframe relative to the second beacon signal.

* * * * *

UNITED STATES PATENT AND TRADEMARK OFFICE
CERTIFICATE OF CORRECTION

| | | |
|---|---|---|
| PATENT NO. | : 7,684,381 B2 | Page 1 of 1 |
| APPLICATION NO. | : 11/121372 | |
| DATED | : March 23, 2010 | |
| INVENTOR(S) | : Schrum, Jr. et al. | |

It is certified that error appears in the above-identified patent and that said Letters Patent is hereby corrected as shown below:

Title Page; item (75);

Front page, line 6, Inventor's Name: "Fred S. Stivers," to read as --Fred S. Strivers--

Signed and Sealed this
Fourteenth Day of June, 2011

David J. Kappos
*Director of the United States Patent and Trademark Office*